Patented Aug. 22, 1950

2,519,978

UNITED STATES PATENT OFFICE 2,519,978

GENERATED PROTEINS AND PROCESS FOR PREPARATION THEREOF

Jack J. Press, New York, N. Y.

No Drawing. Application October 11, 1945,
Serial No. 621,861

20 Claims. (Cl. 18—54)

This invention relates to coagulated or regenerated proteins and, in particular, is directed to improvements in the hardening of these substances.

For many years much attention has been devoted to the possibility of producing from cheap proteinaceous substances materials having many of the desirable properties of wool and silk. In general, these efforts have centered principally around the utilization of casein, soy protein, peanut protein, zein, silk waste, fish albumen, and the like, as the starting materials for the manufacture of this class of substances. The processes used for the production of these substances are based on the solution of the proteinaceous material in an appropriate solvent and then most frequently the extrusion of the protein solution into a bath through spinnerets whereby the protein is coagulated in a manner somewhat similar to the formation of cellulosic filaments such as viscose rayon.

Among the solvents used for the solution of the protein there is frequently employed aqueous alkali and the extrusion of the spinning solution is carried out in an acidulated medium. This type of protein regeneration is very often denominated "wet spinning."

In the wet spinning processes there may also be used as solvents for the protein, depending upon the character of the protein used, concentrated organic or inorganic acids, and the coagulation of the protein accomplished by the extrusion of said solutions into baths which cause the protein to coagulate. There may also be used in the wet spinning of protein fibers concentrated salt solutions of the protein or solutions thereof in solvents such as aqueous alcohol and aqueous ketones such as acetone.

It has also been proposed to dissolve proteinaceous materials in volatile solvents from which the protein may be regenerated by evaporation of the solvent. Processes depending upon the evaporation of the solvent with the attendant regeneration of the protein are generally referred to as "dry spinning" processes. Among the solvents used in the preparation of the dry spinning solutions for proteins, there are aqueous alcohol, aqueous acetone, volatile organic acids such as formic acid, volatile organic bases such as morpholine, and liquid ammonia.

Many types of proteins other than those mentioned above have been used or proposed as starting materials for the manufacture of synthetic protein fibers.

Although considerable effort has been devoted to the production of synthetic protein fibers, it has been found that they fail to possess the requisite characteristics which would render them per se adequate for use as dependable textile materials. The known synthetic protein fibers have been found deficient in essential physical and chemical properties in that they possess a low strength and toughness, particularly in the wet condition; they are subject to excessive elongation and are insufficiently resistant to wet processing, especially in scouring and dyeing operations. They cannot be used by themselves and are, therefore, utilized only as partial fillers along with other standard textile fibers.

The foregoing deficiencies are manifested by synthetic protein fibers which have been subjected to known hardening processes.

It has been recognized that it is essential in the course of the generation of the fiber that it be stretched, the stretch being carried out to an extent of even as much as 1,000 per cent. or greater. Theoretical considerations underlying the stretch treatment are based on the concept that the stretch effectuates a molecular orientation of the protein molecules along their major axes and that the effect thereof is to impart increased toughness and strength and reduce the tendency to elongation in the ultimate fiber.

The stretched fiber, however, possesses a considerable contractile tendency so that it is necessary to stabilize the stretched fiber to prevent its reversion to the original unstretched condition. Considerable attention has been devoted to various means for accomplishing such stabilization, depending upon chemical and physical manipulations. Notwithstanding these previous attempts to stabilize the fiber, it has been found that they have failed of themselves to prevent substantial contraction or shrinking of the fiber.

It has also been found that the stretched fiber is greatly lacking in the necessary physical and chemical properties which would render it capable of use as textile material and for this reason considerable attention has been devoted to improving the fiber by various methods of hardening or tanning the stretched coagulated protein.

The hardening or tanning processes involve treatment of the stretched fiber with reagents which render them sufficiently water resistant and sturdy to withstand the various processings in the preparation of the yarn and continuing through the stages leading to the production and uses of the finished textile fabric.

Based on the known property of formaldehyde and other materials to produce "tanning" effects on proteinaceous materials in other arts. attempts have been made to harden or tan the stretched protein fibers by the use of the foregoing agents. Among the materials used to produce this hardening or tanning effect in addition to formaldehyde, there are: butyraldehyde, heptaldehyde, glyoxal, tannic acid, chromates, benzaldehyde, furfural, acrolein, acetals, quinone and syntans.

It has been proposed (British Patent 559,818) that the stretched coagulated protein filament in the form of cut staple be soaked for an extended period in a solution of a bi-functional amide such as urea, thiourea, biuret, or the like; that the staple then be drained of the major portion of the bath, following which the amide-soaked staple be further treated with an aldehyde in an acidic solution.

It is found that this British process produces a negligible improvement in strength and toughness of the fiber in comparison with fibers which have been hardened by the other known processes. Furthermore, there is a considerable contraction of the fiber during the prolonged soaking period in the bi-functional amide solution.

The present invention is a great improvement over the existing art because it affords the industry a much superior synthetic protein fiber.

Accordingly, it is an object of this invention to provide a synthetic protein fiber of increased strength and toughness, particularly as these phenomena are observed in the wet condition.

Another object is to provide a synthetic protein fiber having a greatly increased resistance to elongation.

Another object is to provide a synthetic protein fiber of greatly increased resistance to aqueous processing, particularly in scouring, dyeing, and laundering processes.

Another object of this invention is to provide a synthetic protein fiber characterized by a whiter delustered, more wool-like appearance.

Another object is to provide a synthetic protein fiber having an improved resilient hand.

The improvements in the character of the generated protein material when treated by my novel process result from the thorough and even distribution within the protein material of insoluble condensation bodies.

These insoluble condensation bodies serve to stabilize and reinforce the inner fine structure of the protein material and remain permanently fixed therein when subjected to subsequent normal industrial wet processing treatment.

Condensation bodies (especially those not exceeding a molecular weight of 4,000) are preferred, in contrast to substantially higher molecular weight condensation bodies, because they can more readily and thoroughly penetrate the inner fine structure of the protein material and because they are more reactive chemically with the protein material in those instances where such reaction occurs.

The insoluble condensation bodies can be evenly and thoroughly deposited in the freshly generated protein material in several ways. Thus, the deposition may be accomplished by saturating the freshly generated protein in solutions of condensation bodies or solutions of coparent substances which form condensation bodies. The deposition may also be accomplished by forming the condensation bodies in situ. This method can be carried out, for example, by using the protein as the vehicle for a parent substance of the condensation body and treating such protein with a solution of the coparent substance of the condensation body. In order to constitute the protein as the vehicle for such a parent substance, the parent substance may be dissolved in the spinning solution, and/or the freshly generated protein may be saturated with such parent substance.

It is preferable to form the insoluble condensation bodies while the protein material is in the freshly generated condition. In such state there is relatively little interaction between the protein molecules and they possess a maximum degree of motility and chemical reactivity. Accordingly, the protein molecules in the freshly developed protein material are in condition most readily to respond to the physical, chemical and physico-chemical influences which the participating materials in the hardening process are capable of producing. Thus, the orientation of the protein molecules achieved during the generation is preserved and enhanced by the even and thorough rapid incorporation and deposition of the solidifying condensation bodies.

The treatment of the freshly generated protein material is best effected at a pH below that of the iso-electric region of the protein material used. Under these conditions the protein material seems to have an increased affinity for the condensation bodies and the latter become more permanently and beneficially incorporated therein. With most of the protein materials commonly in use the iso-electric region falls between pH 3.5 and pH 5.5.

The treatment of the freshly generated material is best effected at a temperature not in excess of 70° C. Above this temperature it may become difficult to control damage to the protein material in its freshly developed state before a sufficiently stable structure is formed.

The following examples demonstrate methods of achieving the objects of this invention, it being understood, however, that they are but illustrative embodiments of the various substances which may be used to effectuate the deposition of condensation bodies and of the methods for accomplishing such deposition within the spirit of this invention.

EXAMPLE I

A concentrated alkaline solution of peanut protein (19.8% protein, 0.48% caustic soda, the balance water) was spun into fiber in an acidified, concentrated sodium sulphate precipitation bath, stretched and wound onto a rotating collapsible reel. The fiber, as it was being wound on the reel, was bathed with a drip solution composed of:

| | Percent |
|---|---|
| Sodium chloride | 21.6 |
| Sulphuric acid | 1.94 |
| Water | Balance |

When a sufficient quantity of fiber had been collected to form a skein it was removed from the reel and cut at various points around the circumference to give staple fiber of 4-inch length.

A series of samples of drained fiber (about 50 grams each on a final air dried basis, containing about 125 to 150 cc. of the drip solution) were then subjected to the following treatments at 35° C. for about 24 hours.

Sample 1

The sample was treated with 835 cc. of the following hardening bath:

A

| | Per cent |
|---|---|
| Sodium chloride | 20.4 |
| Sulphuric acid | 1.8 |
| Formaldehyde | 1.8 |
| Water | Balance |

Sample 2

The sample was treated with 835 cc. of the same solution (A) used in the treatment of Sample 1, but containing in addition (B) 2.5 grams of urea.

Sample 3

The sample was treated with 835 cc. of the same solution (A) used in the treatment of Sample 1 but containing in addition (B) 7.5 grams of urea.

Subsequent to treatment, the fiber was washed in water, neutralized in a dilute sodium bicarbonate solution, washed and dried. Periodic analysis of the solutions used for the treatment of Samples 2 and 3 showed that most of the urea (determined as nitrogen) removed from the solution was depleted during the first four hours. In the case of Sample 3 more than 50% of the urea was removed from the solution within four hours' time and only a negligible amount was removed thereafter.

It was observed that when the solutions per se used for the treatment of Samples 2 and 3 were allowed to stand for 24 hours at a temperature of 35° C., no insoluble condensation body was formed. The solutions remained perfectly clear and no precipitation was observed.

Sample 2, and in particular Sample 3, after treatment as described, were stronger and tougher fibers, particularly when wet; had a reduced elongation; were very white and opaque, and had a markedly improved resilience and woolly feel.

Physical tests on Samples 1, 2 and 3 gave the following results:

| Samples | Tenacity (grams/denier) | | Elongation at Break | |
|---|---|---|---|---|
| | dry | wet | dry | wet |
| | | | Per cent | Per cent |
| 1 | 0.77 | 0.27 | 63 | 75 |
| 2 | 0.98 | 0.34 | 54 | 55 |
| 3 | 1.01 | 0.45 | 52 | 53 |

The marked improvements in the physical properties of the fiber are also manifested by its increased modulus, as shown by the following test results:

| Sample | 20% Modulus (grams/denier) Wet |
|---|---|
| 1 | 0.085 |
| 2 | 0.152 |
| 3 | 0.192 |

Another sample (4) of equivalent weight of the drained fiber similar to that used in treating Samples 1, 2, and 3, was subjected to the following processing:

The fiber was first soaked overnight at 35° C. in 850 cc. of the following solution:

| | Per cent |
|---|---|
| Salt | 21.3 |
| Sulphuric acid | 1.9 |
| Urea | 1.7 |
| Water | Balance |

The fiber was then drained and transferred with its adsorbed solution (about 150 cc. containing 1.7% of urea equivalent to 2.55 grams of urea) to 835 cc. of a hardening bath having the following composition:

| | Per cent |
|---|---|
| Sodium chloride | 20.4 |
| Sulphuric acid | 1.8 |
| Formaldehyde | 1.8 |
| Water | Balance | where it was kept at 35° C. for about 24 hours. The 2.55 grams of urea carried over by the fiber from the soaking step made the hardening bath composition similar to that used in the hardening of Sample 2.

The difference in treatment between Sample 2 and Sample 4 was that Sample 2 was subjected in its freshly generated condition directly to the action of a urea-formaldehyde condensation body while Sample 4 in its freshly generated condition was subjected solely to the action of urea, a parent substance of the condensation body for a prolonged period and after such prolonged soaking, then subjected to the action of formaldehyde, a co-parent of the urea-formaldehyde condensation body.

A comparison of the variation in the physical properties of Sample 2 and Sample 4, which demonstrates the importance of effectuating the hardening by the direct action of condensation bodies on the protein materials in their freshly developed state, is shown in the following test results:

| Sample | Tenacity (grams/denier) | | Elongation at Break | | 20% Modulus (grams/denier) wet |
|---|---|---|---|---|---|
| | dry | wet | dry | wet | |
| | | | Per cent | Per cent | |
| 2 | 0.98 | 0.34 | 54 | 55 | 0.152 |
| 4 | 0.73 | 0.27 | 68 | 82 | 0.086 |

On examination of this fiber (Sample 4) after the prolonged soaking in the solution of the urea, prior to the treatment thereof with the urea-formaldehyde condensation body, it was found that the fiber had shrunk during the soak and when it was washed the shrinking continued in a markedly substantial amount. After drying this washed fiber it was found that it had lost its fibrous nature and had changed into a horny, fused mass. The soaking treatment with the urea produced no permanent stabilizing and/or hardening effect on the fiber, as is apparent from the collapse of the fiber structure when it was washed and dried.

It will be observed that notwithstanding the fact that the hardening bath containing urea-formaldehyde condensation bodies was used in the treatment of Sample 4, the physical characteristics of the sample after such treatment are of the same order of magnitude as those exhibited by Sample 1, which was subjected to treatment solely with formaldehyde. The treatment of the freshly stretched fiber with formaldehyde alone (Sample 1) resulted in a partially stabilized fiber as contrasted with the treatment of the same fiber with the urea alone (Sample 4) which resulted in a virtually unstabilized fiber. In certain characteristics the treatment of Sample 4 resulted in a poorer fiber than that of Sample 1 as manifested by considerable shrinkage of the fiber during the treatment, a harsher feel and an increased elongation at break, both in the dry and the wet condition.

These comparisons of the physical properties demonstrate the importance of effectuating the hardening by the direct action of condensation bodies on the coagulated fiber in its freshly generated condition.

EXAMPLE II

A series of samples of drained fibers of similar character and weights as those used in the treatment of the several samples of Example I were then treated as follows:

Sample 1

The hardening bath consisted of 835 cc. of the following solution:

A

| | Per cent |
|---|---|
| Sodium chloride | 20.4 |
| Sulphuric acid | 1.8 |
| Formaldehyde | 1.8 |
| Water | Balance | to which had been added:

B

| | | |
|---|---|---|
| Melamine | grams | 2.5 |

The hardening treatment was effected at a temperature and for a duration of time similar to that of the first three samples of Example I.

The fiber so treated was found to possess an improved wet strength and a greater resilience.

Sample 2

The hardening bath consisted of 835 cc. of a solution similar to (A) of Sample 1, to which had been added:

(B) Water dispersible melamine-formaldehyde-condensate (Aerotex M–3, American Cyanamid Co.) 80% solid—2.5 grams.

The time and temperature of the treatment were similar to that of Sample 1.

The fiber so treated was found to possess a greatly improved appearance, great resilience and a wool-like feel.

Sample 3

The hardening bath consisted of 835 cc. of a solution similar to (A) of Sample 1, to which had been added:

(B) Water dispersible melamine-formaldehyde condensate (Aerotex M–3, American Cyanamid Co.) 80% solid—5.0 grams.

The time and temperature of the treatment were similar to that of Sample 1.

The fiber so treated was found to possess properties similar to those of Sample 2, and, in addition thereto, it possessed increased wet strength.

Sample 4

The hardening bath consisted of 835 cc. of a solution similar to (A) of Sample 1, to which had been added:

(B) Phenol—2.5 grams.

The time and temperature of the treatment were similar to that of Sample 1.

The fiber so treated was found to possess an improved wet strength and a greatly improved appearance and wool-like feel.

Sample 5

The hardening bath consisted of 835 cc. of a solution similar to (A) of Sample 1, to which had been added:

(B) Phenol—5.0 grams.

The time and temperature of the treatment were similar to that of Sample 1.

The fiber so treated was found to be a further improvement over Sample 4, particularly in appearance and feel.

EXAMPLE III

Some fiber similar to that prepared for Example I was made by the same process except that the reel drip was now composed of:

| | Per cent |
|---|---|
| Sodium sulphate | 19.0 |
| Sulphuric acid | 9.3 |
| Water | Balance |

Two samples of drained fiber (about 50 grams each on a final air dried basis, containing about 125 to 150 cc. of the drip solution) were then subjected to the following treatments at 35° C. for about 24 hours.

Sample 1

The sample was treated with 850 cc. of the following hardening bath:

A

| | Per cent |
|---|---|
| Sodium sulphate | 18.2 |
| Sulphuric acid | 8.8 |
| Formaldehyde | 1.7 |
| Water | Balance |

Sample 2

The sample was treated with 850 cc. of the same solution (A) used in the treatment of Sample 1, but containing in addition (B) 3.75 grams of urea.

Subsequent to treatment the fiber was washed in water, neutralized in a dilute sodium bicarbonate solution, washed and dried. Periodic analysis of the solution used for the treatment of Sample 2 showed that most of the urea (determined as nitrogen) depleted, amounting to almost 50% of that used, was removed from the solution within four hours' time.

A comparison of Samples 1 and 2 showed Sample 2 to have a greatly increased whiteness and opacity, and a markedly improved resilience and woolly feel.

Physical tests gave the following results:

| Samples | Tenacity (grams/denier) | | Elongation at Break | | 20% Modulus (grams/denier) wet |
|---|---|---|---|---|---|
| | dry | wet | dry | wet | |
| 1 | 0.66 | 0.24 | 70 | 101 | 0.069 |
| 2 | 0.87 | 0.37 | 61 | 68 | 0.150 |

As in Example I, the treatment of the stretched freshly coagulated protein material with the deposition of insoluble condensation bodies therein resulted in a much stronger and tougher fiber, particularly when wet, with a reduced elongation.

In the large scale continuous treatment of coagulated protein fiber it may be desirable to modify the foregoing procedures for ease of control. In the following examples (IV, V and VI), applicable for continuous hardening operations, the fiber is quickly saturated with a solution of a parent substance of a condensation body prior to its entrance into the hardening bath so that the saturated fiber functions as a vehicle for replenishing the hardening bath with the parent substance to take the place of that which is being exhausted during treatment with a continuously circulating hardening bath. The concentration (about 1 to 10 per cent. by weight) of the parent substance in the saturation solution is so adjusted that the fiber simultaneously introduces a suitable amount of parent substance into the co-parent containing hardening bath.

I prefer to apply the parent substance while the fiber is still under tension (in the coagulating bath, stretch bath or wash bath or drip) and then immediately to cut it into a staple fiber, thereby relieving the tension, and then rapidly to harden it. This procedure minimizes the length of time the saturated fiber remains in the untensioned condition before entering the hardening bath, thereby eliminating any deleterious effects which might result if the fiber were soaked for too long a period in the solution of the parent substance prior to its hardening.

EXAMPLE IV

A spin solution similar to that used in Example I but containing in addition 1.0% urea was spun into fiber in an acidified, concentrated sodium sulphate precipitation bath containing 1.85% urea, stretched, contacted while still under tension with a drip solution of the following composition:

| | Per cent |
|---|---|
| Sodium chloride | 21.2 |
| Sulphuric acid | 1.2 |
| Urea | 1.75 |
| Water | Balance | wound around a godet wheel and allowed to collect continuously in an untensioned condition in a jar containing 835 cc. of a bath of the following composition:

| | Per cent |
|---|---|
| Sodium chloride | 20.4 |
| Sulphuric acid | 1.8 |
| Formaldehyde | 1.8 |
| Water | Balance | until a quantity of fiber equivalent to 50 grams on the final air-dried weight had been collected therein. The fiber was then treated in the latter solution at 35° C. for about 24 hours.

Subsequent to treatment, the fiber was washed in water, neutralized in a dilute sodium bicarbonate solution, washed and dried at room temperature.

This example illustrates my preferred large scale continuous treatment in which the spin solution is continuously replenishing the parent substance of a condensation body, in this instance urea, in the coagulating bath as it is being exhausted therefrom, and the coagulating bath uniformly and efficiently saturates the freshly generated fiber with the proper concentration of the parent substance, which is maintained by the chloride drip solution, so that as it enters the hardening bath the saturated fiber functions as a vehicle for replenishing the bath with the required amount of parent substance to take the place of that which would be exhausted by the fiber during treatment with a continuously circulating hardening bath containing in solution the co-parent of the condensation body.

This procedure eliminates the necessity of a special saturation treatment with a solution of the parent substance and also eliminates any lapsed time in the untensioned condition before the fiber is subjected to the action of the condensation bodies.

It was found that fiber so treated possessed an improved white, wool-like appearance and a very woolly and resilient feel.

Physical tests run on the sample gave the following results:

| Tenacity (grams/denier) | | Elongation at Break | |
|---|---|---|---|
| Dry | Wet | Dry | Wet |
| 0.97 | 0.39 | Per cent 48 | Per cent 47 |

EXAMPLE V

A spin solution made up with a commercial milk casein (B-1 casein, Casein Corporation of America) as the protein base was spun into a coagulating bath similar to that used in Example I but containing in addition 1.85% urea.

The fiber was generated in a similar fashion as in Example IV except that the fiber, instead of being collected directly in the untensioned condition, was wound onto a collapsible reel while being bathed with a drip solution similar to that used in Example IV. When the required quantity of fiber had been collected to form a skein, it was removed and cut into staple fiber. The cut fiber was then immediately subjected to treatment at 35° C. for about 24 hours in 835 cc. of a hardening bath similar in composition to that used in the treatment of Example IV.

Subsequent to treatment, the fiber was washed in water, neutralized, washed and then dried at a temperature of about 35° C.

The fiber treated in this fashion was quickly and uniformly saturated in the coagulating bath with the parent substance of a condensation body without the necessity of a separate saturation process prior to entering the hardening bath.

The fiber so treated was found to possess an appearance even whiter and more wool-like than the peanut protein fiber of Example IV and to have a very woolly and resilient feel.

The fiber was found to have the following physical properties:

| Tenacity (grams/denier) | | Elongation at Break | |
|---|---|---|---|
| Dry | Wet | Dry | Wet |
| 0.94 | 0.34 | Per cent 47 | Per cent 47 |

EXAMPLE VI

A spin solution made up with a commercial partly degraded soybean protein (Alpha Protein, Glidden Co.) as the protein base was spun into a coagulating bath similar to that used in Example V.

A quantity of fiber similar to that used in Example V was subjected to treatment with the same reel drip solution and hardening bath and in a similar fashion as in Example V.

Subsequent to treatment, the fiber was washed in water, neutralized, washed and then dried at a low temperature.

The fiber so treated was found to possess a white, wool-like appearance and to have a very woolly and resilient feel.

The physical properties of the fiber made from this degraded protein was not as satisfactory as those obtained in the previous examples.

The fiber was found to have the following physical properties:

| Tenacity (grams/denier) | | Elongation at Break | |
| --- | --- | --- | --- |
| Dry | Wet | Dry | Wet |
| 0.68 | 0.24 | Per cent 46 | Per cent 87 |

It is to be observed that, although I prefer to carry out continuous hardening operations with the staple in untensioned state, it is possible to effectuate the hardening while the fiber is under tension.

As patent materials or substances which may be used in the formation of condensation bodies there may be used mono or poly functional substances from the following representative classes:

Aldehydes
Ketones
Amides
Amines
Sulphonic acids
Carboxylic acids
Thiocyanates
Hydroxy compounds
Amino acids
Phenolic compounds The following examples serve to illustrate the types of soluble materials which can deposit insoluble condensation bodies on contact with the protein material:

Benzamide plus formaldehyde
Benzamide plus formaldehyde plus methanol
Caproamide plus formaldehyde
Caproamide plus formaldehyde plus methanol
Urea plus formaldehyde
Urea plus formaldehyde plus methanol
Carbowax plus formaldehyde
Carbowax plus formaldehyde plus methanol
Sucrose plus formaldehyde
Sucrose plus formaldehyde plus methanol
Ammonium thiocyanate plus formaldehyde plus methanol
Melamine plus formaldehyde
Melamine plus formaldehyde plus methanol
Melamine-formaldehyde condensates
Urea-formaldehyde condensates
Phenol plus formaldehyde
Phenol plus formaldehyde plus methanol
Phenol-formaldehyde condensates The marked improvement in the character of my novel hardened-protein materials resides in the above described novel process of treating the freshly generated protein with a solution containing condensation bodies or parent substances of condensation bodies. The protein treated under such conditions is different in structure from all of the hardened, tanned or stabilized generated proteins prepared by known processes. The structure of my new protein materials is one wherein the protein-constituents are evenly and thoroughly surrounded and reinforced by the condensation bodies which are deposited when the generated protein is in a condition of optimum receptivity to the penetration, distribution, formation and deposition of condensation bodies.

What I claim is:

1. The process which comprises introducing a protein solution into a precipitating medium whereby a precipitated protein structure is produced; stretching said precipitated protein structure to orient the molecules thereof; and while said molecules are in said oriented condition and after removal of the said structure from the said precipitating medium treating said structure with a solution of condensation bodies to deposit throughout the same condensation bodies whereby a completely stabilized, hardened and reenforced protein structure is produced.

2. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same, at a pH below the isoelectric region of the protein material, condensation bodies whereby a completely stabilized, hardened and reenforced protein structure is produced.

3. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same, at a temperature not in excess of 70° C., condensation bodies whereby a completely stabilized, hardened and reenforced protein structure is produced.

4. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same, at a pH below the isoelectric region of the protein material and at a temperature not in excess of 70° C., condensation bodies whereby a completely stabilized, hardened and reenforced protein structure is produced.

5. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same amide-aldehyde condensation bodies whereby a completely stabilized, hardened and reenforced protein structure is produced.

6. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same, at a pH below the isoelectric region of the protein material and at a temperature not in excess of 70° C., amide-aldehyde condensation bodies whereby a completely stabilized, hardened and reenforced protein structure is produced.

7. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same urea-formaldehyde condensation bodies whereby a completely stabilized, hardened and reenforced protein structure is produced.

8. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same, at a pH below the isoelectric region of the protein material and at a temperature not in excess of 70° C., urea-formaldehyde condensation bodies whereby a completely stabilized, hardened and reenforced protein structure is produced.

9. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same melamine-formaldehyde condensation bodies whereby a completely stabilized, hardened and reenforced protein structure is produced.

10. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same, at a pH below the isoelectric region of the protein material and at a temperature not in excess of 70° C., melamine-formaldehyde condensation bodies whereby a completely stabilized, hardened and reenforced protein structure is produced.

11. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same phenol-formaldehyde condensation bodies whereby a completely stabilized, hardened and reenforced protein structure is produced.

12. The process which comprises introducing a protein solution into a precipitating medium whereby a precipitated protein structure is produced; stretching said precipitated protein structure to orient the molecules thereof; and while said molecules are in said oriented condition and after removal of the said structure from the precipitating medium treating said structure with a solution of condensation bodies to deposit throughout the same, at a pH below the isoelectric region of the protein material and at a temperature not in excess of 70° C., phenol-formaldehyde condensation bodies whereby a completely stabilized, hardened and reenforced protein structure is produced.

13. The process in accordance with claim 1 characterized in that the stretching of the precipitated protein structure takes place in the presence of a non-protein hardening parent substance of the said condensation bodies.

14. The process in accordance with claim 1 characterized in that the protein solution contains a non-protein hardening parent substance of the said condensation bodies.

15. A new composition comprising a protein material precipitated from a protein solution in a precipitating medium whereby a precipitated protein structure is produced, the said structure being stretched to orient the molecules thereof and while said molecules are in said oriented condition and after removal of said structure from the precipitating medium treating said structure with a solution of condensation bodies to deposit throughout the said structure condensation bodies whereby a stabilized, hardened, and reenforced protein structure is produced that is characterized by a wet 20% modulus of not less than about 0.15 gram per denier.

16. A new composition comprising a protein material precipitated from a protein solution in a precipitating medium whereby a precipitated protein structure is produced, the said structure being stretched to orient the molecules thereof and while said molecules are in said oriented condition and after removal of said structure from the precipitating medium treating said structure with a solution of condensation bodies to deposit throughout the said structure, at a pH below that of its isoelectric region and at a temperature not in excess of 70° C., condensation bodies whereby a stabilized, hardened and reenforced protein structure is produced that is characterized by a wet 20% modulus of not less than about 0.15 gram per denier.

17. The process in accordance with claim 1 characterized in that the precipitating medium contains a non-protein hardening parent substance of the said condensation bodies.

18. The process in accordance with claim 1 wherein the condensation bodies are ammonium thiocyanate-formaldehyde condensation bodies.

19. The process in accordance with claim 2 wherein the condensation bodies are ammonium thiocyanate-formaldehyde condensation bodies.

20. The process in accordance with claim 3 wherein the condensation bodies are ammonium thiocyanate-formaldehyde condensation bodies.

JACK J. PRESS.

REFERENCES CITED

The following references are of record in the file of this patent:

UNITED STATES PATENTS

| Number | Name | Date |
| --- | --- | --- |
| 2,195,930 | Koch | Apr. 2, 1940 |
| 2,211,961 | Meigs | Aug. 20, 1940 |
| 2,312,998 | DeKadt | Mar. 2, 1943 |

FOREIGN PATENTS

| Number | Country | Date |
| --- | --- | --- |
| 508,781 | Great Britain | June 26, 1939 |
| 559,818 | Great Britain | Mar. 7, 1944 |